Aug. 2, 1955  J. A. L. ROZIERES  2,714,282
APPARATUS FOR NULLIFYING RESIDUAL TWISTS OF CABLES
Filed Oct. 22, 1952
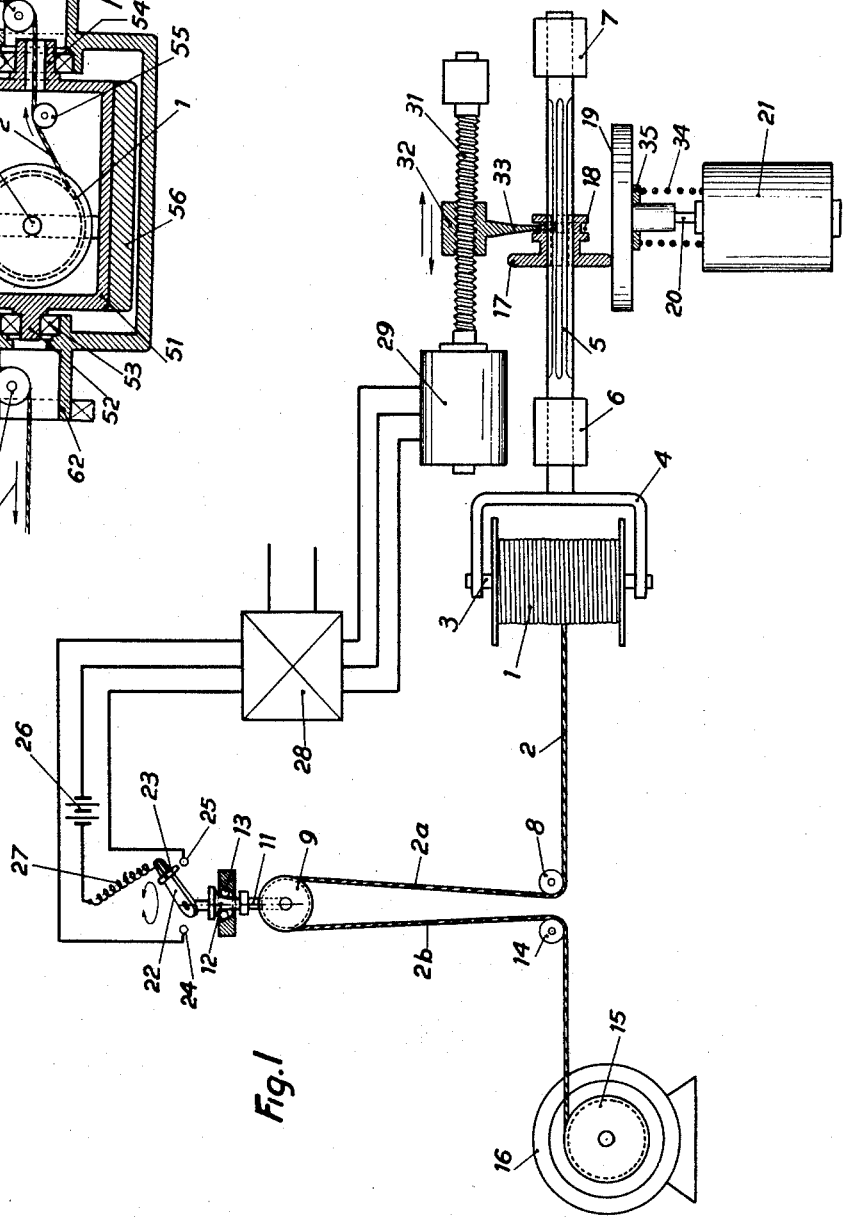
Inventor
Jean Alfred Louis Rozieres
by Robert E. Burns
Attorney United States Patent Office 2,714,282
Patented Aug. 2, 1955

2,714,282

APPARATUS FOR NULLIFYING RESIDUAL TWISTS OF CABLES

Jean Alfred Louis Rozieres, Paris, France

Application October 22, 1952, Serial No. 316,120

Claims priority, application France October 29, 1951

7 Claims. (Cl. 57—34)

It frequently happens that after fabrication and reeling a cable of fine wires presents residual elastic twists which tend to coil it up when it is unwound.

The present invention has for its object to provide an apparatus for doing away with this inconvenience by mounting the reel, onto which the cable is wound, on a special support that permits this reel to rotate at right angles to its axis of unwinding.

This apparatus comprises a speed variator which causes a discharge reel carrier to receive a rotary motion, which may vary continuously from $+N$ to $-N$ revolutions per minute, to correct the residual twisting of the cable. The cable is then wound, completely inert, onto a receiving reel, the entrainment of the cable and receiving reel being effected by the usual means.

The number of revolutions between $+N$ and $-N$ per minute corresponding to the number of springy twists, per unit length of the cable to be compensated, is controlled by a torsion balance comprising an orientable yoked pulley around which the cable passes having its inlet and outlet portions substantially parallel to the pulley yoke axis.

The residual twists in the cable orient the pulley in one sense or in the other sense; these orientations are imported to a system of varying the speed and the sense of rotation of the axle of the discharge reel. The rotations of the reel carrier are such that the twists are nullified and tend to be imparted in the inverse sense, a fact which, causing the inversion of the pulley yoke of torsion balance, gives rise to the inverse rotation of the reel carrier, and so on.

In this way, all the twists of the unwound cable are positively nullified and the cable is wound, completely inert, onto the receiving reel.

The intermediate means between the torsion balance and the shaft that sets in rotation the discharge reel carrier, at the desired speed and in the desired sense, may be of any suitable character, such for example as electrically, hydraulically or pneumatically operated subordinations.

In order that the invention may be more clearly understood, the same will now be described, by way of example with reference to the accompanying schematic drawings in which:

Fig. 1 is a schematic view of an ensemble of apparatus according to the present invention; and Fig. 2 is a sectional view of a modified portion thereof.

Similar numerals refer to similar parts throughout the two views.

Referring to Fig. 1, it will be seen that the discharge reel 1, onto which is wound the cable 2 presenting residual springy turns, has its axle 3 fixedly supported on a fork 4 which in turn is fixedly supported on the end of a grooved shaft 5 journaled in stationary bearings 6 and 7. The cable 2, unwound from the reel 1 substantially along the forwardly extended axis of the shaft 5, passes around a guide roller 8 from which a cable length 2a passes around a yoked pulley 9 whence a cable length 2b passes around a guide roller 14 from which the cable 2 is wound onto a receiving reel 15 of a winder 16. The pulley yoke 11 is provided with an axle 12, vertical for example, rotatable in a stationary ball bearing 13.

The lineal speed of winding the cable, onto the receiving reel by which the winder exerts a pull that causes this cable to be unwound in the apparatus, will preferably be held constant by any appropriate means not shown and forming no part of this invention which is not concerned with the cable winder.

The grooved shaft 5, limitedly rotatable in the bearings 6 and 7, carries a friction roller 17 slidable on and rotatable with this shaft and whose hub is provided with a groove 18.

This roller 17 is displaceable on the plane face of a disc 19 slidably mounted on, and rotatable by, the shaft 20 of a motor 21, this disc 19 being continually applied against the roller 17 by a spring 34 and an interposed abutment 35.

The shaft 20 and the grooved shaft 5 have their axes concurring and perpendicular at a point lying substantially in the middle of grooves, between the bearings 6 and 7.

It results therefrom that the contact point of 17 upon 19 will move along a diameter and, consequently, the roller 17 will have continuous speed variations from a maximum $+N$ in one direction to a maximum $-N$ in the contrary direction, while passing through zero when the contact is in the center of the disc 19.

These variations are controlled by the torsion balance pulley 9 in the manner hereinafter described.

Oscillating together with the balance axle 12 is a finger 22 provided with a contactor 23 displaceable between two stationary abutment contacts 24 and 25.

The contactor 23 is connected to one pole of a source of current 26 by means of a deformable conductive member, such as a spring 27, adapted to bring the pulley 9 into its position of equilibrium, whereas the other pole of the source of current 26 and the contacts 24, 25 are connected with a reversing relay 28 suitable for controlling a motor 29 in such a way that its shaft may rotate in endless screw 31 in one direction or in the contrary direction. A nut 32 slides, without rotating, on screw 31 and carries a fork 33 which, cooperating with the groove 18, causes the roller 17 to slide along the grooved shaft 5.

Accordingly as the contactor 23 is applied against 24 or 25, the displacement of the roller 17 will take place in one sense or in the other, its speed and sense of rotation depending on how long the contact will last. The rotation will stop or change its sense when, by nullification of the springy twists, the pulley 9 and the finger 22 will come to the position of equilibrium, indicating that the residual twisting is nullified prior to the pulley 9 and that the cable wound onto 15 is free from springy turns.

Of course, the fork 4 that supports the discharge reel 1 may be a double twist frame, such as shown in Fig. 2, in which the reel 1 has its axle 3 supported in the frame 51. The latter has a solid axial forward projection 52 journalled in a ball bearing 53, and a bored axial rear projection 54 journalled in a ball bearing 57. The cable 2 passes axially through the bored projection 54 and, to this effect, is guided by a roller 61 and a roller 55 whose axle is supported in the frame 51.

The frame 51 remains continually in vertical position under the action of a counterweight 56 secured to the frame bottom.

The ball bearings 53, 57 are coaxial with the grooved shaft 5 and supported by an outer revolving frame 58 whose rear end is provided with a laterally open box 59 extending into the shaft 5 and containing the aforesaid roller 61 around which the cable 2 passes out of the box 59.

The cable 2 then passes forward, around guide rollers 63 and 64, into a box 62 coaxial with the shaft 5 and the box 59 and containing a guide roller 65 around which the cable passes out of this box in the direction of the arrow 66, toward the remainder of apparatus. The box 62 extends from the revolving frame 58 and is journaled in a bearing 67 supported by a framework not shown.

The advantage of this disposition, known per se, is to impart to the cable 2 two twists for each revolution of the shaft 5 and to allow the reel 1 to rotate merely about its immovable axle 3, whereby it is possible to balance the parts in rotation about the axis of rotation of the shaft 5.

The operation of the apparatus is apparent from the foregoing description and materialises the conditions of the invention.

Of course the continual change of speed and sense for ensuring the untwisting rotation of the cable may be effected by any other appropriate means.

It will be understood that various changes and modifications may be made in the illustrative embodiments of the invention hereinabove described and illustrated in the drawing without departing from the scope of the invention as defined in the appended claims and it is intended, therefore, that all matter contained in the description and in the drawing shall be interpreted as illustrative only.

What is claimed is:

1. Apparatus of the class described for automatically nullifying residual twists of a cable after its fabrication and reeling, which comprises in combination a discharge reel containing said cable, means for supporting said reel, means for translating residual twists of said cable when it is pulled by a winder from said reel and through said translating means, and a transmission system controlled by said translating means and adapted to act upon the said reel supporting means in a manner to cause the cable length comprised between the said reel supporting means and the said translating means to undergo untwisting such as to nullify the springy turns thereof.

2. Apparatus of the class described for automatically nullifying residual twists of a cable after its fabrication and reeling, which comprises in combination a swinging discharge reel containing said cable, means for supporting said reel, a torsion balance for translating residual twists of said cable when it is pulled by a winder from the said reel and through the said torsion balance, and a transmission system controlled by the said torsion balance and adapted to act upon the said reel supporting means in a manner to cause the said reel to swing in one sense and in the contrary sense so as to thereby impose on the cable length between the reel and the torsion balance untwistings such as to nullify the springy turns thereof.

3. Apparatus of the class described for automatically nullifying residual twists of a cable after its fabrication and reeling, which comprises in combination a swinging discharge reel containing said cable, means for supporting said reel, means for translating residual twists of said cable while it is pulled by a winder from the said reel and through the said translating means, a transmission system controlled by the said translating means, a variably movable member controlled by the said transmission system, a movable member supporting the said reel, and means operatively interconnecting the two members in a manner to cause the said reel to swing in one sense and in the contrary sense so as to thereby impose on the cable length between the reel and the translating means untwistings such as to nullify the springy turns thereof.

4. Apparatus of the class described for automatically nullifying residual twists of a cable after its fabrication and reeling, which comprises in combination a swinging discharge reel containing said cable, means for supporting said reel, means for translating residual twists of said cable while it is pulled by a winder from the said reel and through the said translating means, a transmission system controlled by the said translating means, a variable rotating shaft controlled by the said transmission system and adapted to act upon the said reel supporting means in a manner to cause the said reel to swing in one sense and in the contrary sense so as to thereby impose on the cable length between the reel and the translating means untwistings such as to nullify the springy turns thereof.

5. Apparatus of the class described for automatically nullifying residual twists of a cable after its fabrication and reeling, which comprises in combination a swinging discharge reel containing said cable, means for supporting said reel, means for translating residual twists of said cable while it is pulled by a winder from the said reel and through the said translating means, a transmission system controlled by the said translating means, a shaft controlled by the said transmission system, a shaft parallel to said shaft and supporting the said reel, and means operatively interconnecting the two shafts in a manner to cause the said reel to swing in one sense and in the other so as to thereby impose on the cable length between the reel and the translating means untwistings such as nullify the springy turns thereof.

6. Apparatus of the class described for automatically nullifying residual twists of a cable after its fabrication and reeling, which comprises in combination a swinging discharge reel containing said cable, a shaft supporting said reel, a torsion balance for translating residual twists of said cable while it is pulled by a winder from the said reel and through the said torsion balance, an electromechanical transmission system controlled by the said torsion balance, an electric motor controlled by the said transmission system and having its shaft extended parallel to the said reel supporting shaft, and means operatively interconnecting the two shafts in a manner to cause the said reel to swing in one sense and in the other so as to thereby impose on the cable length between the reel and the torsion balance untwistings such as to nullify the springy turns thereof.

7. In an apparatus of the class described for automatically nullifying residual twists of a cable after its fabrication and reeling, the combination of a discharge reel containing said cable, means for supporting said reel, said supporting means including a first frame in which said reel is journalled, a second frame enclosing said first frame and rotatably supporting said first frame, means for translating residual twists of said cable while it is pulled by a winder from the said reel and through the said translating means, and a transmission system controlled by the said translating means and adapted to act upon the said reel supporting means in a manner to cause the cable length between the reel supporting means and the translating means to undergo untwistings such as to nullify the springy turns thereof.

References Cited in the file of this patent

UNITED STATES PATENTS

| 1,436,312 | Grondahl | Nov. 21, 1922 |
| 1,565,862 | Massingham | Dec. 15, 1925 |
| 1,862,345 | Wolf | June 7, 1932 |

FOREIGN PATENTS

| 616,790 | Germany | Aug. 5, 1935 |
| 700,914 | Germany | Jan. 3, 1941 |
| 798,220 | France | Mar. 2, 1936 |